United States Patent Office 3,128,315
Patented Apr. 7, 1964

3,128,315
METHYLCHLOROFORM STABILIZED WITH DI-
ALKYLETHERS OF ALKYLENE GLYCOLS
Donald E. Hardies, Wadsworth, Ohio, assignor to Pittsburgh Plate Glass Company (Chemical Division), Pittsburgh, Pa., a corporation of Delaware
No Drawing. Filed Mar. 13, 1961, Ser. No. 95,004
5 Claims. (Cl. 260—652.5)

This invention relates to the stabilization of methylchloroform and in particular deals with the prevention of decomposition thereof. It also deals with the reduction of the corrosive attack of methylchloroform upon metals.

Methylchloroform (1,1,1-trichloroethane) is a liquid chlorinated hydrocarbon which is generally useful in degreasing applications especially involving small metal parts often expediently cleaned by "bucket" degreasing. As such, methylchloroform is most useful for liquid phase degreasing and cleaning of manufactured articles from dirt, grease, oils and the like. Presently, vapor phase degreasing applications of methylchloroform are of lesser importance although methylchloroform is useful for this purpose. Minor uses of methylchloroform involve its use as a dry cleaning spotting agent and a vapor pressure depressant for aerosols.

In these and other uses of methylchloroform it comes in contact with a variety of metal articles many of which would be ruined on contact with an active chemical or acidic forming substance. Further, metal chips accumulate in equipment employed in degreasing and, especially when composed of dissimilar metals, corrosive action in the presence of moisture may be stimulated. Chlorinated hydrocarbons in general have a tendency to become acid under conditions leading to their decomposition. In this respect unstabilized methylchloroform is notorious. Hence, the practical application of methylchloroform depends upon its adequate stabilization.

Chlorinated hydrocarbons are subject to more than one type of decomposition such as that induced by oxidation in the presence of light, heat or moisture; or hydrolysis and metal halide induced decomposition. One or more of these types of decomposition are particularly serious in the case of methylchloroform which has a greater tendency to decompose than certain other chlorinated hydrocarbons. Also chlorinated hydrocarbons generally require their own specific stabilizers such that a stabilizer for one chlorinated hydrocarbon is not a stabilizer for another chlorinated hydrocarbon. This prevents the prediction of stabilizing properties for proposed additives to methylchloroform. These and other problems impose restriction on the use of unstabilized methylchloroform. Thus, decomposition tendencies of methylchloroform must be overcome in order to provide adequate commercial utility.

It has now been discovered that the decomposition tendency to methylchloroform and the resulting attack on metals, especially light metals such as aluminum, is delayed or largely prevented in accordance herewith. Thus, methylchloroform has been provided with a greater utility.

In accordance with this invention dialkyl ethers of diols containing from 2 to 4 carbon atoms in the diol residue and up to about 4 carbon atoms in the alkyl groups reduce or prevent one or more of the decomposition tendencies of methylchloroform. To accomplish these benefits a quantity of a dialkyl ether of a diol, notably a dialkyl ether of ethylene glycol and especially the dimethyl ether of ethylene glycol, is added in stabilizing proportion to a methylchloroform composition. Methylchloroform compositions containing up to about 7 weight percent of the methylchloroform content of dimethoxyethane are employed with increasing effectiveness in liquid degreasing solvents to prevent decomposition.

The dialkyl ethers of diols are represented by the general formula:

$$R_1OXOR_2$$

in which $R_1$ and $R_2$ are alkyl groups and may contain the same or a different number of carbon atoms up to 4 and in which X is an alkylene residue of a diol containing 2 to 4 carbon atoms. Thus, the lower alkyl ethers of certain alkanes are effective. Higher dialkyl ethers have a stabilizing effect when employed in accordance herewith but have reduced value because of objectionable features. Those compounds boiling above 150° C. have greatly reduced vapor pressure and tend to remain on parts degreased with methylchloroform formulations containing such higher boiling materials after evaporation of the residual solvent following the cleaning operation. Further, cost becomes an added deterrent to the higher molecular weight dialkyl ethers of diols. Thus, while the higher members of the series may be used to accomplish stabilization, the value imparted is offset by newly added difficulties. Dimethoxyethane is accordingly the preferred member of the series.

Dialkyl ethers of diols or dialkoxyalkanes which are employed in this invention to accomplish stabilization are preferably those containing fewer than 10 carbon atoms. That is the sum of the number of carbon atoms in alkyl groups $R_1$ and $R_2$ and in the alkylene residue X should be no more than 10 to produce best results. Specifically intended are 1,4-dimethoxybutane;
1-methoxy-4-ethoxybutane;
1-methoxy-4-n-propoxybutane;
1-methoxy-4-iso-propoxybutane;
1-methoxy-4-n-butoxybutane;
1-methoxy-4-iso-butoxybutane;
1-methoxy-4-sec-butoxybutane;
1-methoxy4-tert-butoxybutane;
1,4-diethoxybutane;
1-ethoxy-4-n-propoxybutane;
1-ethoxy-4-iso-propoxybutane;
1-ethoxy-4-n-butoxybutane;
1-ethoxy-4-iso-butoxybutane;
1-ethoxy-4-sec-butoxybutane;
1-ethoxy-4-tert-butoxybutane;
1,3-dimethoxybutane;
1methoxy-3-ethoxybutane;
1-methoxy-3-n-propoxybutane;
1-methoxy-3-iso-propoxybutane;
1-methoxy-3-n-butoxybutane;
1-methoxy-3-iso-butoxybutane;
1-methoxy-3-sec-butoxybutane;
1-methoxy-3-tert-butoxybutane;
1,3-diethoxybutane;
1-ethoxy-3-n-propoxybutane;
1-ethoxy-3-iso-propoxybutane;
1-ethoxy-3-n-butoxybutane;
1-ethoxy-3-iso-butoxybutane;
1-ethoxy-3-sec-butoxybutane;
1-ethoxy-3-tert-butoxybutane;
1,2-dimethoxybutane;
1-methoxy-2-ethoxybutane;
1-methoxy-2-n-propoxybutane;
1-methoxy-2-iso-propoxybutane;
1-methoxy-2-n-butoxybutane;
1-methoxy-2-iso-butoxybutane;
1-methoxy-2-sec-butoxybutane;
1-methoxy-2-tert-butoxybutane;
1,2-diethoxybutane;

1-ethoxy-2-n-propoxybutane;
1-ethoxy-2-iso-propoxybutane;
1-ethoxy-2-n-butoxybutane;
1-ethoxy-2-iso-butoxybutane;
1-ethoxy-2-sec-butoxybutane;
1-ethoxy-2-tert-butoxybutane;
2,3-dimethoxybutane;
2-methoxy-3-ethoxybutane;
2-methoxy-3-n-propoxybutane;
2-methoxy-3-iso-propoxybutane;
2-methoxy-3-n-butoxybutane;
2-methoxy-3-iso-butoxybutane;
2-methoxy-3-sec-butoxybutane;
2-methoxy-3-tert-butoxybutane;
2,3-diethoxybutane;
2-ethoxy-3-n-propoxybutane;
2-ethoxy-3-iso-propoxybutane;
2-ethoxy-3-n-butoxybutane;
2-ethoxy-3-iso-butoxybutane;
2-ethoxy-3-sec-butoxybutane;
2-ethoxy-3-tert-butoxybutane;
2-methyl-1,3-dimethoxypropane;
2-methyl-1-methoxy-3-ethoxypropane;
2-methyl-1-methoxy-n-propoxyethane;
2-methyl-1-methoxy-3-n-propoxypropane;
2-methyl-1-methoxy-3-iso-propoxypropane;
2-methyl-1,3-diethoxypropane;
2-methyl-1-ethoxy-3-n-propoxypropane;
2-methyl-1-ethoxy-3-iso-propoxypropane;
2-methyl-1,2-dimethoxypropane;
2-methyl-1-methoxy-2-ethoxypropane;
2-methyl-1-methoxy-2-n-propoxypropane;
2-methyl-1-methoxy-2-iso-propoxypropane;
2-methyl-1,2-diethoxypropane;
2-methyl-1-ethoxy-2-n-propoxypropane;
2-methyl-1-ethoxy-2-iso-propoxypropane;
1-methoxy-2-n-propoxypropane;
1-methoxy-2-iso-propoxypropane;
1-methoxy-2-n-butoxypropane;
1-methoxy-2-iso-butoxypropane;
1-methoxy-2-sec-butoxypropane;
1-methoxy-2-tert-butoxypropane;
1,2-dimethoxypropane;
1-methoxy-2-ethoxypropane;
1,2-diethoxypropane;
1-ethoxy-2-n-propoxypropane;
1-ethoxy-2-iso-propoxypropane;
1-ethoxy-2-n-butoxypropane;
1-ethoxy-2-sec-butoxypropane;
1-ethoxy-2-iso-butoxypropane;
1-ethoxy-2-tert-butoxypropane;
1,2-di-n-propoxypropane;
1,2-di-iso-propoxypropane;
1-methoxy-3-n-propoxypropane;
1-methoxy-3-iso-propoxypropane;
1-methoxy-3-n-butoxypropane;
1-methoxy-3-iso-butoxypropane;
1-methoxy-3-sec-butoxypropane;
1-methoxy-3-tert-butoxypropane;
1,3-dimethoxypropane;
1-methoxy-3-ethoxypropane;
1,3-diethoxypropane;
1-ethoxy-3-n-propoxypropane;
1-ethoxy-3-iso-propoxypropane;
1-ethoxy-3-n-butoxypropane;
1-ethoxy-3-sec-butoxypropane;
1-ethoxy-3-iso-butoxypropane;
1-ethoxy-3-tert-butoxypropane;
1,3-di-n-propoxypropane;
1,3-di-iso-propoxypropane;
1,2-dimethoxyethane;
1-methoxy-2-ethoxyethane;
1-methoxy-2-n-propoxyethane;
1-methoxy-2-iso-propoxyethane;
1-methoxy-2-n-butoxyethane;
1-methoxy-2-sec-butoxyethane;
1-methoxy-2-iso-butoxyethane;
1-methoxy-2-tert-butoxyethane;
1,2-diethoxyethane;
1-ethoxy-2-n-propoxyethane;
1-ethoxy-2-iso-propoxyethane;
1,2-di-n-propoxyethane;
1,2-di-iso-propoxyethane;
1,2-di-n-butoxyethane;
1,2-di-sec-butoxyethane;
1,2-di-iso-butoxyethane and
1,2-di-tert-butoxyethane.

It has also been discovered that the notable stabilization action of dimethoxyethane disclosed herein may be further extended by the incorporation of certain other substances in addition to the dimethoxyethane. An added amount of one of these substances of from 0.1 to 5.0 weight percent based on the methylchloroform content of the composition will suffice to provide a degree of protection still greater than that provided by the dimethoxyethane alone. This cooperative stabilizing effect is observed with 1,4-dioxane; epoxides such as dipentene dioxide, glycidol, cyclohexene oxide, butylene oxides and epichlorohydrin; 2-methyl-3-butyn-2-ol; nitroalkanes such as nitromethane; and tert-butanol.

In the practice of this inevntion concentrations of dimethoxyethane as low as 0.1 weight percent based on the methylchloroform content of the composition tend to reduce attack on light metals, notably aluminum. However, concentrations on the order of 3 to 5 weight percent are preferred and reduce attack sufficiently to permit practical utilization. Concentrations as high as 7 weight percent are sometimes preferred. The benefits which accrue are augmented by the addition of certain other chemicals, notably 1,4-dioxane. When used in conjunction with a second material, it is observed that the quantity of dimethoxyethane which is required to reduce accordingly. Thus, 1.7 weight percent 1,4-dioxane and 1.7 weight percent dimethoxyethane may be employed in place of approximately 4 percent by weight dimethoxyethane. Thus, the stabilizing activity of dimethoxyethane inures to the formulation and is augmented by the coaction of certain other materials.

Methylchloroform compositions containing from 0.5 to 7.0 weight percent symmetrical dimethoxyethane and from 0.5 to 5.0 weight percent of 1,4-dioxane may be employed with increasing effectiveness to avoid decomposition induced by extreme contamination.

Useful second materials which augment the effect of dimethoxyethane include the acetylenic alcohols. A typical acetylenic alcohol which leads to this cooperative type of stabilization is 2-methyl-3-butyn-2-ol. While this material is especially effective, other acetylenic alcohols may also be employed. For example, propargyl alcohol; 2-butyn-1-ol; 3-butyn-2-ol; 3-methyl-1-pentyn-3-ol; 3-ethyl-1-pentyn-3-ol; 2-methyl-3-hexyn-2-ol; 3,5-dimethyl-1-hexyn-3-ol; 2,5-dimethyl-3-hexyn-2,5-diol; 3,6-dimethyl-4-octyn-3,6-diol and like, triply bonded, unsaturated alcohols may be employed. The selection of an acetylenic alcohol depends to a degree on its boiling point. A methylchloroform formulation intended for use in "bucket" degreasing would most advantageously employ an acetylenic alcohol to impart the degree of stabilization desired. For vapor phase degreasing the lower acetylenic alcohols would be preferred. Normally the 3 to 12 carbon chain triply bonded, unsaturated alcohols are efficacious.

The quantity of acetylenic alcohol used in conjunction with dimethoxyethane depends on the quantity of dimethoxyethane employed. When dimethoxyethane concentrations of from 3 to 5 weight percent of the methylchloroform are employed, a quantity of 2-methyl-3-butyn-2-ol of from 0.5 weight percent to 5.0 weight percent of the methylchloroform will produce more stable methylchloroform formulations.

Augmented stability of methylchloroform compositions containing dimethoxyethane as a principal stabilizer is also realized by the addition of from 0.1 to 5.0 weight percent of a nitroalkane. From 0.1 to 5.0 weight percent of nitromethane may be incorporated with from 0.1 to 7.0 weight percent of symmetrical dimethoxyethane based on the methylchloroform content to obtain compositions possessing improved stability. However, significant stability will be imparted by lesser quantities of nitromethane. Other nitroalkanes such as nitroethane, 1-nitropropane and 2-nitropropane are useful.

Saturated short chain aliphatic monohydric alcohols, notably those containing from 1 to 8 carbon atoms, may be employed in the cooperative stabilization of methylchloroform compositions containing dimethxyethane as a principal stabilizer. From 0.5 to 5.0 weight percent of aliphatic alcohol is useful to augment the stability of compositions containing from 0.5 to 7.0 weight percent of dimethoxyethane based on the methylchloroform content. Notably useful are the 1 to 8 carbon alcohols including methanol, ethanol, propanol, iso-propanol, n-butanol, tertiary-amyl alcohol, hexanol, octanol and tertiary-butanol. From 0.5 to 5.0 weight percent of t-butanol and from 0.5 to 7.0 weight percent of symmetrical dimethoxyethane base on the methylchloroform content is particularly effective.

One mode in which the herein described invention may be practiced is shown in the following examples.

EXAMPLE I

The testing of stabilized methylchloroform formulations is conveniently carried out by employing two tests. One of these uses strips of aluminum ½ inch by 2 inches, approximately 20 gauge, which are scratched with a steel scribe while beneath the surface of 30 milliliters of the methylchloroform formulations to be tested. Several scratches are made on the surface of the aluminum which is then allowed to stand. Observations are made periodically in which particular attention is paid to the color of the solvent, the appearance of the scratches on the strip and the formation of any precipitate in the solvent. After 24 hours a numerical rating is assigned to the solvent in which numbers from 1 to 5 are assigned to each, the color of the solvent, appearance of the strip and degree of precipitate formation. The individual numbers are then averaged to obtain the scratch test number. However in case complete solvent decomposition occurred as evidenced by a black, tar-like mass remaining in the bottle, a scratch test number of 10 is assigned. Thus, to a sample in which no coloration of solvent occurred, no precipitate formed, and no black marks in the scratch could be observed, a value of unity would be assigned. Varying degrees of decomposition are assigned numbers between 2 and 5 with, of course, complete solvent decomposition being given at rating of 10.

The second test employed makes use of a similar strip of aluminum which measures ½ inch by 3 inches. This strip is polished with No. 1 Emery cloth to produce a uniform bright area free from tarnish. The specimen is not handled with the bare hands but is washed with soap and water then washed thoroughly with distilled water followed by acetone and finally allowed to dry in the air. This strip of metal is placed in a flask and partially covered with 50 milliliters of the solvent to be tested. The flask is then fitted to a condenser arranged so that condensate will fall on the surface of the strip in the flask. An Erlenmeyer flask, 125 milliliter size, is employed and is heated on a hot plate while refluxing for a period of 48 hours. At the end of this time the condition of the aluminum strip and the color of the solvent are noted.

Methylchloroform formulations were prepared by adding the appropriate amount of chemical to methylchloroform to result in 100 grams of mixture. By way of illustration a solution containing 3.2 weight percent of dimethoxyethane was prepared by adding 3.2 grams of dimethoxyethane to 96.8 grams of unstabilized methylchloroform to result in 100 grams of a 3.2 weight percent formulation of dimethoxyethane. In this way several formulations were prepared and tested according to the tests outlined above with the results shown in Table I.

Table I

METHYLCHLOROFORM FORMULATIONS

| Formulation | Concentration, Weight percent | Scratch Test Number | Aluminum Reflux Test, 48 Hours |
|---|---|---|---|
| Dimethoxyethane | 2 | } 2.3 | Solvent decomposed less than 24 hours. |
| 2-methyl-3-butyn-2-ol | 1.5 | | |
| Dimethoxyethane | 3 | } 2 | No stain or corrosion of strip, solvent clear and colorless. |
| tert-butanol | 2 | | |
| Dimethoxyethane | 3.2 | 2.3 | No stain or corrosion of strip, solvent clear with slight color formation. |
| Dimethoxyethane | 2.0 | } 1.3 | No stain or corrosion of strip, solvent clear and colorless. |
| 2-methyl-3-butyn-2-ol | 1.5 | | |
| tert-butanol | 1.5 | | |
| Methylchloroform | No Additive | 10 | Solvent decomposed 10 min. |
| 1,4-dioxane | 1.6 | 10 | Solvent decomposed 7 hours. |
| Dimethoxyethane | 1.6 | } 2.0 | No stain or corrosion of strip, solvent clear and colorless. |
| 1,4-dioxane | 1.6 | | |

While the invention has been described with reference to certain specific embodiments thereof, it is not intended that the invention be limted thereto except insofar as set forth in the following claims.

I claim:

1. Methylchloroform containing a stabilizing concentration of a dialkyl ether of a diol having the formula:

$$R_1OXOR_2$$

in which $R_1$ is an alkyl radical containing up to 4 carbon atoms, $R_2$ is also an alkyl radical containing up to 4 carbon atoms and X is an alkylene residue containing up to 4 carbon atoms.

2. Methylchloroform containing a stabilizing concentration of a dialkyl ether of ethylene glycol having the following formula:

$$R_1OCH_2CH_2OR_2$$

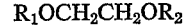

in which $R_1$ is an alkyl radical containing up to 4 carbon atoms and $R_2$ is also an alkyl radical containing up to 4 carbon atoms.

3. Methylchloroform containing a stabilizing concentration of symmetrical dimethoxyethane.

4. Methylchloroform stabilized with from 0.1 to 7.0 weight percent of symmetrical dimethoxyethane.

5. Methylchloroform containing a stabilizing concentration of a dialkyl ether of an alkylene glycol having up to 4 carbon atoms in the alkylene residue and a total of up to 10 carbon atoms.

References Cited in the file of this patent

UNITED STATES PATENTS

| 2,088,085 | Gross et al. | July 27, 1937 |
| 2,272,470 | Lincoln et al. | Feb. 10, 1942 |
| 2,371,645 | Aitchison et al. | Mar. 20, 1945 |
| 2,407,405 | Dietrich et al. | Sept. 10, 1946 |
| 2,870,094 | Cathcart | Jan. 20, 1959 |

FOREIGN PATENTS

| 765,522 | Great Britain | Jan. 9, 1957 |